Patented Apr. 21, 1953

2,635,977

UNITED STATES PATENT OFFICE 2,635,977

POLYCYCLIC INSECTICIDAL DIENES

Rex E. Lidov, Denver, Colo., assignor, by mesne assignments, to Shell Development Company, Emeryville, Calif., a corporation of Delaware No Drawing. Application August 21, 1948, Serial No. 45,573

10 Claims. (Cl. 167—30)

This invention relates to new compositions of matter possessing unexpectedly high toxicity to insect life.

More specifically, this invention relates to a group of polycyclic halogenated hydrocarbons and derivatives thereof which show not only unexpectedly high insecticidal activity, but, in addition, a surprisingly high order of stability to reagents which normally readily degrade the previously known organic halogenated insect toxicants, and it also relates to the methods of producing these new compositions.

One object of this invention is to produce organic materials possessing a high order of insecticidal activity.

A further object of this invention is the production of a group of stable, insecticidally active organic compounds with varying periods of residual insecticidal activity.

Other objects, features, capabilities and advantages are comprehended by the invention, as will later appear and as are inherently possessed thereby.

In recent years a number of halogenated hydrocarbons or simple hydrocarbon derivatives have been discovered which possess, to a high degree, the property of toxicity to various forms of insect life. All of these materials contain halogen atoms, some of which, in the presence of alkalinity, are labile. The loss of halogen under these circumstances, whether by substitution reactions or by dehydrohalogenation leaves the altered organic molecule with its insecticidal activity either markedly decreased or altogether destroyed.

The coincidence of highly labile halogen and insecticidal activity has been so marked that many able investigators in the field have suspected that a causal relationalship must exist between the ease of halogen removal and the insecticidal properties of the molecule, and attempts to develop quantitative correlations between these properties have been made. In addition, a number of theories have been advanced in an attempt to justify the establishment of such a causal relationship.

The ease with which halogen and, concomitantly, insecticidal activity is lost from these compounds has, of course, restricted their use in situations in which a more stable insecticide could have been employed advantageously. This unfortunate instability has also increased the difficulties of formulating and of storing them for practical field use.

Quite unexpectedly, therefore, I have now made the surprising and novel discovery that a group of new halogenated compounds can be prepared which, while possessing a very high order of insecticidal activity, have their halogen atoms so firmly bound as to make them stable under conditions of alkalinity which cause the older halogenated insecticidal materials to lose halogen, and, simultaneously, to lose activity.

These new compounds of my invention are characterized by the following structural formula:

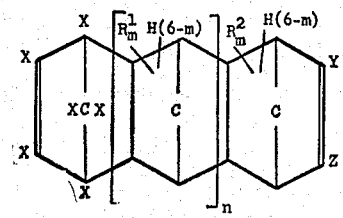

in which X represents a halogen atom, $n$ has an integral value from 0 to 3, both inclusive, and $m$ has an integral value from 0 to 6, both inclusive, Y and Z are selected from the group of monovalent atoms and radicals consisting of $-H$, $-R$, $-Cl$, $-Br$, $-I$, $-OR$, $-SR$, $-N(R)_2$, $-N(R)_3^+$, $$R-\overset{O}{\underset{\|}{C}}-,\ R-\overset{O}{\underset{\|}{C}}-O-,\ -COOH,\ -COOR,\ \text{or}\ -C\equiv N$$

In the group of atoms and radicals set forth above R represents a saturated hydrocarbon radical, an unsaturated hydrocarbon radical, a substituted derivative of a hydrocarbon radical or a substituted derivative of an unsaturated hydrocarbon radical. $R^1$ and $R^2$ in the structural formula shown represent one or more halogen atoms or one or more substituting radicals as defined above for R which may be attached to carbon atoms forming the indicating rings of the structure shown when the attachment of the $R^1$ or $R^2$ group is to the carbon atom of the methano bridge, these groups may also represent alkylidene type groups.

For the sake of simplicity the substituents in the pentacarbon cycles, other than the terminal completely halogenated ring are represented by the symbol $R_m^1$ and $R_m^2$, where $m$ may range over an integral value from 0–6, both inclusive. More than one R type substituent may be present attached to the carbon atoms of the pentacarbon cycle, the number of groups so attached being defined by the integral value of $m$, except that when one of the groups is an alkylidene or cycloalkylidene group the total number of groups present is defined as $(m-1)$. The value of $m$ thus defines the number of substituents in each cycle.

Since, in these rings each carbon atom must be attached either to a substituent, as previously defined, or to a hydrogen atom, the number of hydrogen atoms remaining attached to carbon atoms in each pentacarbon ring is given by the value of $(6-m)$. The R type groups may arise through the use of substituted cyclopentadienes in the preparation of the polycyclic dienophiles and similarly through the use of fulvenes in the preparation of these dienophiles.

These new and remarkable compounds which I have discovered can in general be most readily prepared by means of the Diels-Alder diene synthesis using a hexahalocyclopentadiene and a suitable polycyclic dienophile such as a bicycloheptadiene or a tetracyclododecadiene. These new polycyclic dienophiles are disclosed in the copending application of Hyman, Freireich, and Lidov, U. S. Serial No. 45,574, filed August 21, 1948.

The synthesis of my new compositions can be accomplished by heating the reactants together for a suitable period of time. In the majority of cases, the reactions proceed rapidly and well at temperatures between 80–150° C. and at atmospheric pressure or at pressures which are only slightly above atmospheric pressure over a four to twenty-four hour time period. Actually, it is the vapor pressure of the lowest boiling generator which determines the operating pressure, and when the boiling point of this generator lies above 80° C. the synthesis can usually be carried out at atmospheric pressure. Of course, if the polycyclic reactant boils in the temperature range in which the reaction is being conducted provision must be made for its reflux.

These novel halogenated hydrocarbons and their derivatives embraced by my invention can also be prepared in the presence of suitable solvents. In general, reactions in solution require a longer period of time than reactions carried out in the absence of solvent. There is some advantage in the use of a solvent, however, which results from the fact that the reaction and the reaction temperature can be somewhat more easily controlled when a solvent is used.

A wide variety of solvents can be employed in carrying out these preparations. The rate of reaction will be highest if the solvent chosen has a boiling point above 80° C. For this purpose, chlorobenzene, xylene, dibutyl ether, etc., can advantageously be chosen. If desired, however, materials such as benzene, toluene, butyl alcohol, dioxane. etc. can also be used, at the expense, of course, of reaction time.

In general, in the majority of cases the Diels-Alder synthesis can conveniently be carried out using substantially equimolar quantities of each of the generators. In the case of these new compounds which I have discovered, I have found it advantageous to use at least two moles of the polycyclic dienophile per mole of diene and frequently to use an even larger molar excess of the dienophilic generator. The reason for carrying out the reactions in this fashion arises from the fact that each molecule of the polycyclic dienophile is capable of reacting with two molecules of diene; hence, unless the dienophile is present in excess, the product resulting from the reaction is a mixture of the mono- and the di-adduct of the dienophile with the diene. I have found, however, that if the dienophile is present in at least molar excess, the formation of the reaction product with two moles of diene is suppressed to such an extent that no more than approximately 5 per cent of this di-adduct is formed.

Example I illustrates the method by which one of the insecticidal compositions of my invention can be prepared in the absence of solvent. In this case the desired reaction product is hexachlorotetracyclododecadiene. The dienophilic generator is bicyclo-(2.2.1)-2,5-heptadiene first prepared by Hyman, Freireich, and Lidov and disclosed in co-pending application, U. S. Serial No. 45,574, filed August 21, 1948.

EXAMPLE I

To 750 grams of bicyclo-(2.2.1)-2,5-heptadiene (8.16 moles) was added 750 grams (2.74 moles) of hexachlorocyclopentadiene (mole ratio, diene:dienophile::1:3) and the mixture was heated for a period of 16–18 hours at a temperature between 85–90° C. Since the dienophile boils in this range at 630 mm. Hg pressure, the apparatus must provide for its reflux. At the end of this time the excess dienophile was removed by distillation and the resulting viscous syrup further subjected to distillation under 20 mm. Hg pressure with heating continued until the liquid material in the flask reached a temperature of 125° C. This latter operation removed some oily impurities present in the reaction mixture. The flask residue solidified on cooling. The crude hexachlorotetracyclododecadiene thus obtained represents almost the theoretical weight of product expected based on the amount of chlorinated diene used. This crude product was distilled at about 1 mm. Hg pressure. A forerun, boiling to a vapor temperature of 132° C. and weighing 39.0 grams was discarded, after which, by rapid distillation, 786 grams of product was collected between 132–150° C. The distillate, which solidified in the receiver, was dissolved in and recrystallized from a mixture consisting of one liter of acetone and 2.5 liters of methanol. By this means 530 grams of white, needle-like crystalline solid, separable by filtration, was obtained. The solid melts at 104–104.5° C. Analysis gave the following results:

Cl, 58.30%: Calculated for hexachlorotetracyclododecadiene ($C_{12}H_8Cl_6$); Cl, 58.29%.

Based on its analysis and its mode of preparation, the compound is believed to have the following structural formula:

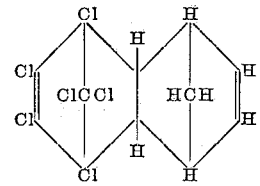

Hexachlorotetracyclododecadiene is extremely soluble in most organic liquids.

Hexachlorotetracyclododecadiene can also be prepared by the method of Example II which illustrates a synthesis with but a molar excess of dienophile, and a different mode of recovery of the desired product.

EXAMPLE II

To 600 grams (2.2 moles) of hexachlorocyclopentadiene is added 400 grams (4.36 moles) bicyclo-(2.2.1)-2,5-heptadiene and the mixture is gently refluxed for 16 hours. The excess dienophile is removed by distillation, first at atmospheric pressure and finally at 10 mm. Hg pressure at a pot temperature of 105° C. The crude solid thus obtained weighed 808 grams (100.6% of theory based on the chlorinated diene). Seven hundred grams of this crude material was added to about 2500 ml. of hot methanol: of this, 39 grams failed to go into solution, remaining undissolved in the form of a leather-like residue which was removed by filtration. The methanol solution of the crude solid when cooled deposited crystals which, after separation on a filter, were recrystallized from fresh methanol. From this second crystallization, a first crop of white, needle-like crystals was obtained weighing 206 grams. This product melted at 100.5–102° C. A mixture of some of this material with some of the product of Example I showed no melting point depression.

The leather-like solid which remained undissolved when the original crude hexachlorotetracyclododecadiene was added to hot methanol and which was separated on a filter was triturated with acetone. This procedure left 12 grams of an infusible solid as a residue. This solid, recrystallized from boiling xylene, yielded a white, crystalline infusible solid.

Analysis of this material gave the following results:

Cl, 66.59%: Calculated for dodecachlorohexacycloheptadecadiene ($C_{17}H_8Cl_{12}$); Cl, 66.72%. Based on its analysis and its mode of preparation this infusible solid is the Diels-Alder adduct of bicyclo-(2.2.1)-2,5-hepadiene with two moles of hexachlorocyclopentadiene and may be assumed to have the following structure:

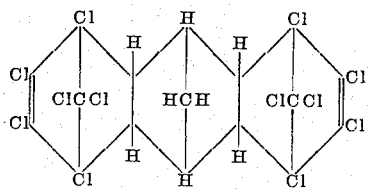

The diadduct of bicyclo-(2.2.1)-2,5-heptadiene with two moles of hexachlorocyclopentadiene can, of course, be prepared substantially quantitatively by the direct reaction of one mole of hexachlorocyclopentadiene with one mole of hexachlorotetracyclododecadiene.

Example III illustrates the preparation of hexachlorotetracyclododecadiene in the presence of a solvent.

EXAMPLE III

A mixture of 39 grams (0.143 mole) of hexachlorocyclopentadiene and 26 grams (0.283 mole) of bicyclo-(2.2.1)-2,5-heptadiene was dissolved in an equal volume (51 ml.) of toluene and the mixture was refluxed for twenty hours. The solvent and the excess bicycloheptadiene were removed by distillation at 60 mm. Hg pressure to a pot temperature of 140° C. The crude product remaining as a residue weighed 48.5 grams (93% of theory based on the chlorinated diene).

Purification of the crude solid by multiple crystallizations from methanol in the fashion described in Example II gave a white crystalline solid which melted in the range 101.5–103° C. and which, when mixed with an authentic sample of hexachlorotetracyclododecadiene, caused no depression of the melting point of the mixture.

Many other new compounds of the same general type falling within the field of my invention can be similarly prepared. A typical example of a similar preparation is illustrated in Example IV, which describes the formation of dicarbethoxyhexachlorotetracyclododecadiene from hexachlorocyclopentadiene and 2,3-dicarbethoxybicyclo-(2.2.1)-2,5-heptadiene.

2,3-dicarbomethoxybicyclo-(2.2.1)-2,5-heptadiene and its preparation from the dimethyl ester of acetylene dicarboxylic acid and cyclopentadiene is described by Diels and Alder (Ann. 490, 236-42 (1931)). Utilizing the procedure they describe but starting instead with dicarbethoxy acetylene the corresponding 2,3-dicarbethoxybycyclo-(2.2.1)-2,5-heptadiene is easily obtained as a clear, mobile liquid of agreeable odor boiling between 97–103° C. at 0.3 mm. Hg pressure.

EXAMPLE IV

A mixture of 11.8 grams of 2,3-dicarbethoxybicyclo-2,5-heptadiene and 14.3 grams (5% molar excess) of hexachlorocyclopentadiene was heated at 140–150° C. for seven hours at atmospheric pressure (approximately 630 mm. Hg). After cooling the reaction mixture was a very viscous, dark colored oil. This material, triturated with ethanol yielded 16.4 grams of a cream colored solid which, upon crystallization from methanol, yielded 12.5 grams of white solid in the form of needle-like crystals which melted at 119° C.

On analysis the following results were obtained:

C, 42.53%: H, 2.92%: Cl, 41.77%: calculated for dicarbethoxyhexachlorotetracyclododecadiene, ($C_{18}H_{14}O_4Cl_6$); C, 42.64%; H, 2.78%: Cl, 41.96%. This material is believed to have the following structural formula:

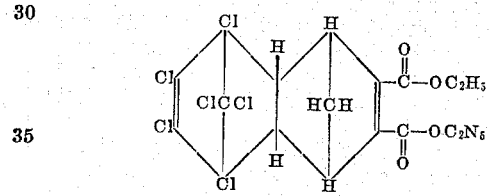

It is obvious that one skilled in the art will immediately see how other compounds similar in character to those here specifically described can readily be prepared. The examples here given are, therefore, presented simply to illustrate the methods which may be used in preparing the new compounds which I have discovered. They are cited for illustrative purposes only and are not to be taken as limiting the scope or character of my invention.

While the preceding examples have illustrated the preparation of my new compounds by means of Diels-Alder type reactions of a conjugated diene and bicycloheptadiene or its derivatives it should be clearly understood that my invention is not limited to compounds thus prepared. Those skilled in the art will readily perceive, now that I have disclosed the existence and utility of such compounds, that the new polycyclic dienes which I have discovered can be made by other means, and such compounds, regardless of the methods used to prepare them properly fall within the scope of my invention.

To indicate the variety of processes which can be employed to prepare compounds of the type I have discovered and herein disclose, it will suffice briefly to illustrate a readily available alternate reaction course.

In my co-pending application, Serial No. 795,140 filed December 31, 1947, the compound hydroxyhexachlorotetracyclododecene is described and its oxidation to the corresponding ketone is indicated. I have found that this ketone, on reaction with one molar equivalent of p-chlorophenyl magnesium bromide yields p-chlorophenylhydroxyhexachlorododecene and that this latter compound, when heated to approximately 250° C., very readily loses the elements of water and forms p-chlorophenylhexachlorotetracyclododecadiene.

Thus, even when the bicycloheptadiene derivatives, necessary as dienophiles, may not be easily available other procedures can be utilized to prepare the desired new polycyclic dienes which I have discovered.

As is to be expected the alkaline stability of these new compositions will be dependent to some extent on the number and character of the substituents which are attached to the basic halogenated hydrocarbon structures. For my presen purpose the basic hydrocarbon structures are taken to be those represented by the structural formula

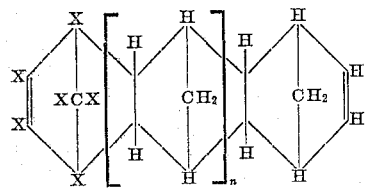

wherein $n$ assumes an integral value from 0 to 3, both inclusive, and X represents a halogen atom. In this connection it should be pointed out that a compound such as, for example, a carboxylic acid ester cannot be expected to exhibit complete stability toward alkali, since it contains a hydrolyzable ester grouping. However, such compounds are alkali stable with respect to their ring halogen.

These new compositions of matter which I have discovered are all highly toxic to insect life. This property, in view of the high alkal stability which they exhibit, is a phenomenon, as has already been indicated, both completely unexpected and of great economic significance.

The high insecticidal potency of my new compounds is illustrated by the data which follows in Table II which shows their toxicity to the common house fly (*Musca domestica*) in terms of the new halogenated insecticide Chlordane, which for this purpose is rated at 100% or in terms of the new halogenated insecticide 1 (or 9),4,5,6,7,8,8-heptachloro-4,7-methano-3a,4,7,7a-tetrahydroindene (hereinafter referred to as Hepta-Klor), which, for comparison with compounds tested against it, is also rated 100%. The figures which are shown were obtained using the Kearns modified small chamber method of test and the figures in Table II represent the relationship between the weight of Chlordane or Hepta-Klor required to produce an LD$_{50}$ and the weight of compound required to produce this same mortality.

The significance of these tests may be more readily appreciated after reference to Table I which shows the ratings of the commonly used organic halogenated insecticides when compared, in tests similar to those described above, with Hepta-Klor.

Table I

| Compound | Relative Toxicity |
|---|---|
| | Percent |
| Hepta-Klor | 100 |
| Gamma isomar, Hexachlorocyclohexane | 100 |
| Chlordane | 40 |
| DDT | 10 |

Table II

| Compound | Relative Toxicity |
|---|---|
| | Percent |
| Chlordane (standard) | 100 |
| Hexachlorotetracyclododecadiene (pure) | 240 |
| Dicarbethoxyhexachlorotetracyclododecadiene | 55 |
| Hepta-Klor (standard) | 100 |
| Hexachlorotetracyclododecadiene (pure) | 85 |
| Hexachlorotetracyclododecadiene (crude) | 76–85 |
| Hexachlorotetracyclododecadiene (distilled) | 85 |

Tests of the insecticidal potency of my new compounds using insects other than flies attest the generality of their high insect toxicity.

Thus, when hexachlorotetracyclododecadiene is compared with Hepta-Klor as a toxicant for the adult female milkweed bug, the two compounds show equal activity.

Tests utilizing the German roach as the test insect indicate similar ultimate toxicities for the two materials but a somewhat higher rate of lethal action is exhibited by my new compound.

When comparative tests between Hepta-Klor and hexachlorotetracyclododecadiene are made using the Black Carpet beetle (*Attagenus piceus*) as the test insect, the two compounds are again found to have substantially equal activities.

Finally, when the chinch bug (*Blissus leucopterus*) is the test insect employed, my new compound hexachlorotetracyclododecadiene is found to exhibit approximately three times the lethal potency of Hepta-Klor for this species.

The new compounds also show significant residual toxicity. In this respect they appear to lie between Chlordane and DDT. This fact, coupled with the fact of their very high degree of stability in the presence of alkaline reagents, indicates for them an immense field of usefulness as agricultural insecticidal materials. The remarkably high alkaline stability of my new compositions is demonstrated by recital of the facts set forth below.

Ten grams of recrystallized hexachlorotetracyclododecadiene was dissolved in 250 ml. of a 0.5 N solution of potassium hydroxide in isopropyl alcohol and heated at the reflux temperature (80° C.) of the solution for a period of one hour. The solution was then diluted with a large volume of water and the mixture obtained extracted with hexane. The hexane solution was washed several times with water, dried, and heated to remove the hexane. The residue thus obtained weighed 9.6 grams, and proved to be unchanged hexachlorotetracyclododecadiene. This was shown by its unaltered halogen analysis and its unimpaired insect toxicity as well, of course, as by its physical properties. The aqueous-alcohol phase gave no test for chloride ion.

It should be noted that under the conditions of the test just described all other known halogenated hydrocarbons useful as insect toxicants, except those disclosed in my co-pending application previously cited, lose one or more molar equivalents of chlorine and, concomitantly, their insecticidal potency.

My new compositions of matter can be utilized as insect toxicants in all of the ways customary in the art. Thus they can be dissolved in the insecticide base oils normally employed (as was done to obtain the data of Table II) and the resulting solutions sprayed and otherwise employed in the usual fashions. They can also be combined with finely divided carriers to produce both wettable and non-wettable insecticidal dusts; they can be used in the presence of emulsifying agents, with water and with water and oils to form insecticidal emulsions. They can also be incorporated in aerosol compositions, and, in general, they can be used either as the sole insect toxicant in an insecticidal composition or in combination with other insecticides in order to obtain combination properties and other desirable characteristics.

It will be apparent to those skilled in the art that these new compositions of matter which I have invented will have many uses other than those already enumerated. Thus, some of these materials will have value as plasticizers and as tackifiers in many types of resinous and polymer compositions. These compositions are also valuable as starting compounds and intermediates for perfumes, medicinals, fungicides and other organic compounds useful in the arts and sciences.

Moreover, many modifications of the basic concept of my invention here presented will be evident to those skilled in the art. Thus, in place of a hexahalocyclopentadiene, as the diene, compounds such as 1,1-dialkoxy-2,3,4,5-tetrahalocyclopentadiene or the corresponding 1,1-dialkylmercapto - 2,3,4,5-tetrahalocyclopentadiene might be employed. Such modifications are properly to be included within the scope of my disclosed invention which is, in no wise, to be restricted by the various illustrative data hereinbefore contained but only by the claims appended hereto.

It is claimed:
1. A compound having the structure:

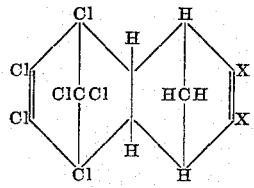

wherein X is of the group consisting of (1) hydrogen, and said compound has a melting point of about 100.5 to about 104.5° C. and (2) carbethoxy, and said compound has a melting point of about 119° C.

2. A compound having the structure:

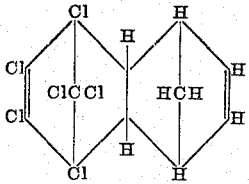

said compound when substantially pure and in crystalline form having a melting point of from about 100.5 to about 104.5° C.

3. A compound having the structure:

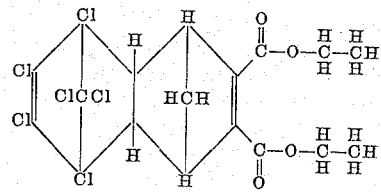

and melting point of about 119° C.

4. The method of forming a new composition of matter which comprises reacting hexachlorocyclopentadiene with a compound of the group consisting of bicyclo-(2.2.1)-2,5-heptadiene and 2,3 - dicarbethoxybicyclo-(2.2.1)-2,5-heptadiene by heating the reactants in the liquid phase.

5. The method of forming a new composition of matter which comprises reacting hexachlorocyclopentadiene with bicyclo-(2.2.1)-2,5-heptadiene at a temperature of from about 80 to about 150° C.

6. The method of forming a new composition of matter which comprises reacting hexachlorocyclopentadiene with a molar excess of bicyclo-(2.2.1)-2,5-heptadiene at a temperature of from about 80 to about 150° C.

7. An insecticidal composition of matter comprising 1,2,3,4,10,10 - hexachloro - 1,4,4a,5,8,8a-hexahydro - 1,4,5,8-dimethanonaphthalene having a melting point of about 100.5° to about 104.5° C. disseminated in an insecticidal adjuvant as a carrier therefor.

8. The method which comprises applying to insects and their habitats a compound of claim 1.

9. The method which comprises applying to insects the compound 1,2,3,4,10,10-hexachloro-1,4,4a,5,8,8a - hexahydro - 1,4,5,8 - dimethanonaphthalene having a melting point of about 100.5° to about 104.5° C.

10. The method which comprises applying to insect habitats the compound 1,2,3,4,10,10-hexachloro-1,4,4a,5,8,8a - hexahydro 1,4,5,8-dimethanonaphthalene having a melting point of about 100.5° to about 104.5° C.

REX E. LIDOV.

References Cited in the file of this patent

UNITED STATES PATENTS

| Number | Name | Date |
| --- | --- | --- |
| 2,010,841 | Bender | Aug. 13, 1935 |
| 2,352,606 | Alder et al. | July 4, 1944 |
| 2,382,038 | Bruson | Aug. 14, 1945 |
| 2,519,190 | Hyman | Aug. 15, 1950 |

OTHER REFERENCES

Prill—J. A. C. S., volume 69, pages 62 to 63 (1947).

Knipling—Soap and Sanitary Chem., pages 127, 129, 131, July 1947.

Plummer—"Dow Diamond," volume 10, number 4, pages 1 to 2 (1947).

Norton—"Chemical Reviews," volume 31, pages 387 to 392 (1942).